(12) United States Patent
Reimnitz

(10) Patent No.: US 8,108,965 B1
(45) Date of Patent: Feb. 7, 2012

(54) CONVERTIBLE PARTICULATE VACUUM ATTACHMENT

(76) Inventor: Richard L. Reimnitz, Corsica, SD (US)

( * ) Notice: Subject to any disclaimer, the term of this patent is extended or adjusted under 35 U.S.C. 154(b) by 1202 days.

(21) Appl. No.: 11/895,047

(22) Filed: Aug. 23, 2007

(51) Int. Cl.
*A47L 11/30* (2006.01)
*E01H 1/08* (2006.01)

(52) U.S. Cl. ............... 15/340.1; 15/362; 15/416; 15/418

(58) Field of Classification Search ...... 15/340.1–340.4, 15/354, 362, 416–418; *A47L 11/30; E01H 1/08*
See application file for complete search history.

(56) References Cited

U.S. PATENT DOCUMENTS

| | | | |
|---|---|---|---|
| 3,808,632 A * | 5/1974 | Aagesen | 15/83 |
| 4,643,776 A | 2/1987 | Hollowell et al. | |
| 4,660,248 A * | 4/1987 | Young | 15/340.1 |
| 4,662,800 A | 5/1987 | Anderson et al. | |
| 4,881,855 A | 11/1989 | Rempel et al. | |
| 5,839,157 A * | 11/1998 | Strauser et al. | 15/347 |
| 5,983,447 A | 11/1999 | Boomgaarden | |
| 6,355,112 B1 | 3/2002 | Bartholmey et al. | |
| 6,584,640 B2 * | 7/2003 | Vanderlinden | 15/418 |
| 6,976,287 B2 | 12/2005 | Muth | |

OTHER PUBLICATIONS

REM Enterprises Inc., GrainVAC 37 Brochure, Date Unknown, p. 3, Swift Current, SK, Canada.
REM Enterprises Inc., GrainVAC 2500 Brochure, Date Unknown, pp. 1 and 3, Swift Current, SK, Canada.
Nessa Inc., 2007 Nessa Catalog: REM Grain Vac Options, Date Unknown, p. 17, available from: http://www.nessainc.com/Catalog/P17.pdf, Accessed Jun. 5, 2007.
GRAINWATCHDOG.COM, UltraCart Product Page, Date Unknown, p. 1, Galahad, Alberta, Canada, available from: http://www.grainwatchdog.com/HomePageSide/MyOff-FarmJob/UltraCart.htm, Accessed Jun. 5, 2007.
Brandt Agricultural Products Ltd., GrainVac 5000/5000EX Brochure, Date Unknown, p. 1 and 3, Regina, SK, Canada.

* cited by examiner

*Primary Examiner* — David Redding
(74) *Attorney, Agent, or Firm* — Jeffrey A. Proehl; Woods, Fuller, Shultz & Smith PC

(57) ABSTRACT

A convertible vacuum attachment for conveying a particulate material is disclosed. The attachment comprises a housing defining a chamber, with the housing having an inlet in fluid communication with the chamber and that defines an inlet opening. The housing has an outlet in fluid communication with the chamber for connection to a vacuum source. The convertible vacuum attachment also comprises an area changing structure configured to change an area of the inlet opening from a first area to a second area.

12 Claims, 5 Drawing Sheets

CONVERTIBLE PARTICULATE VACUUM ATTACHMENT

BACKGROUND OF THE INVENTION

1. Field of the Invention

The present invention relates to particulate movement apparatus and more particularly pertains to a new convertible particulate vacuum attachment for effectively applying a vacuum to particles congregated in a pile and dispersed about a substantially flat surface.

2. Description of the Prior Art

Vacuums can be used to collect a variety of particulate matter in a variety of conditions. For example, city maintenance departments deploy street sweeping vehicles to dislodge and collect dirt and rubbish from streets. Organizations involved in the manufacture and handling of particulate products sometimes employ vacuum conveying technology to move ingredients and products throughout their production cycle. Individuals involved in grain commodities, including farmers and grain elevator staff, often use vacuum apparatus to move quantities from grain from one location to another. Sometimes the particulate matter is positioned in piles on a surface, and sometimes the particulate matter is dispersed about the surface, and many times the particulate matter to be conveyed is positioned in piles and dispersed.

Typical vacuum apparatus consist of an input, a vacuum source and an output. A variety of attachments are typically mounted to the input for the purpose of directing material into the vacuum source. A hose or tube is usually interposed between a vacuum attachment and this input, so that the user can direct material from within a limited distance of the vacuum apparatus into the suction unit providing the vacuum source.

A number of apparatus have been proposed that provide a vacuum attachment for conveying piles of material or for conveying loose particles. However, the known apparatus do not appear to provide a vacuum attachment that is equally effective for addressing both a pile of material and particles dispersed across a surface. The user of the apparatus has been faced with the undesirable choice between the use of different attachments that are either suitable for addressing piles of particulate or for addressing dispersed particulate granules, but not both. Some attempts have been made to address both situations, but these approaches tend to be more effective for addressing one of these situations, but less effective or even unsuitable for the other situation.

In these respects, the convertible particulate vacuum attachment according to the present invention substantially departs from the conventional concepts and designs of the prior art, and in so doing provides an apparatus highly effective for applying a vacuum to particles congregated in a pile and also particles dispersed about a substantially flat surface.

SUMMARY OF THE INVENTION

In view of the foregoing disadvantages inherent in the known types of vacuum apparatus now present in the prior art, the present invention provides a new convertible particulate vacuum attachment wherein the same can be utilized for effectively applying a vacuum to particles congregated in a pile and dispersed about a substantially flat surface.

To attain this, the present invention generally comprises a convertible vacuum attachment for conveying a particulate material. The attachment comprises a housing defining a chamber. The housing may have an inlet in fluid communication with the chamber. The inlet defines an inlet opening. The housing has an outlet in fluid communication with the chamber for connection to a vacuum source. The attachment also comprises an area changing structure configured to change an area of the inlet opening from a first area to a second area.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The various features of novelty which characterize the invention are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to, the following detailed description thereof. Such description makes reference to the annexed drawings wherein.

DESCRIPTION OF PREFERRED EMBODIMENTS

Figure 1:
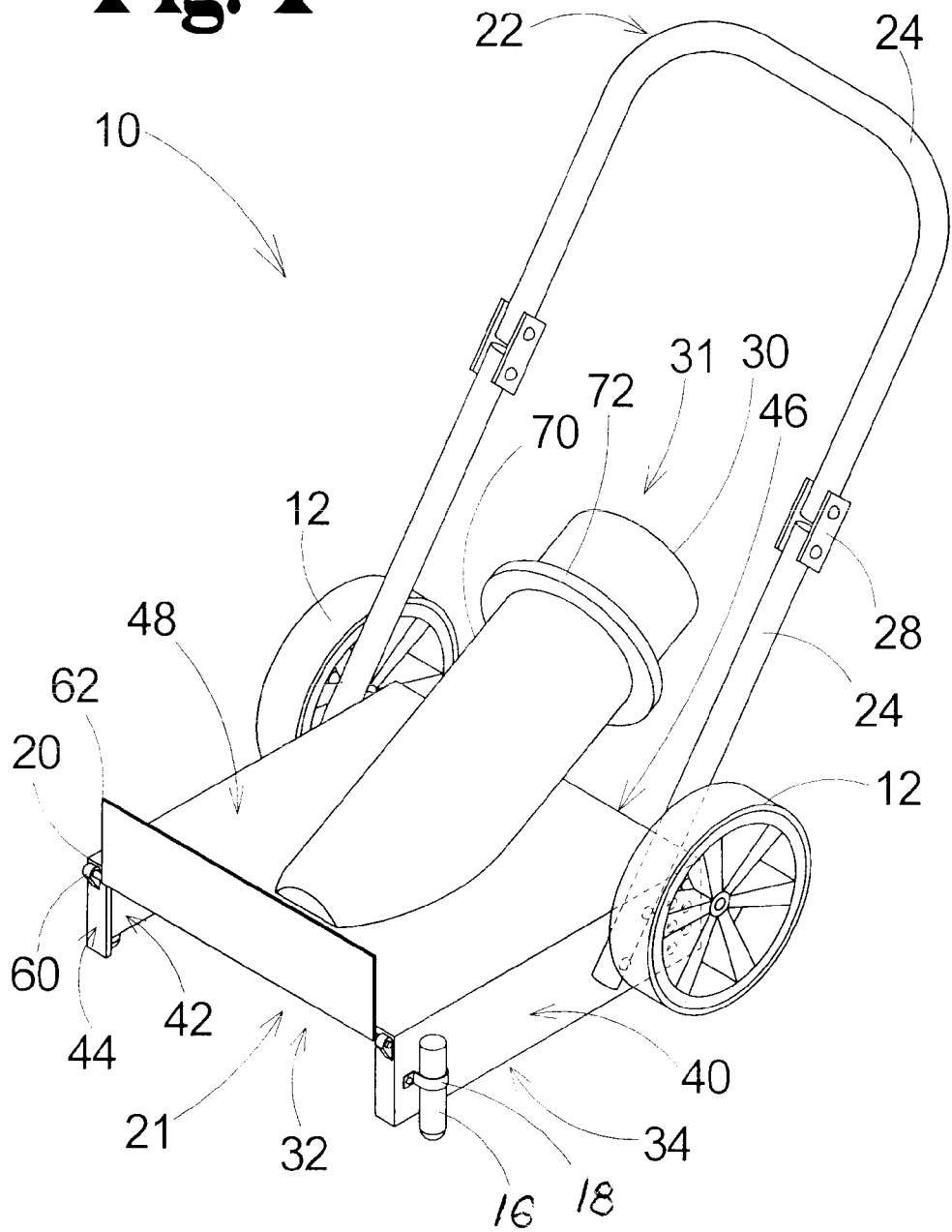
FIG. 1 is a schematic perspective view of a new convertible particulate vacuum attachment according to the present invention.

With reference now to the drawings, and in particular to FIGS. 1 through 5 thereof, a new convertible particulate vacuum attachment embodying the principles and concepts of the present invention and generally designated by the reference numeral 10 will be described.

Figure 2:
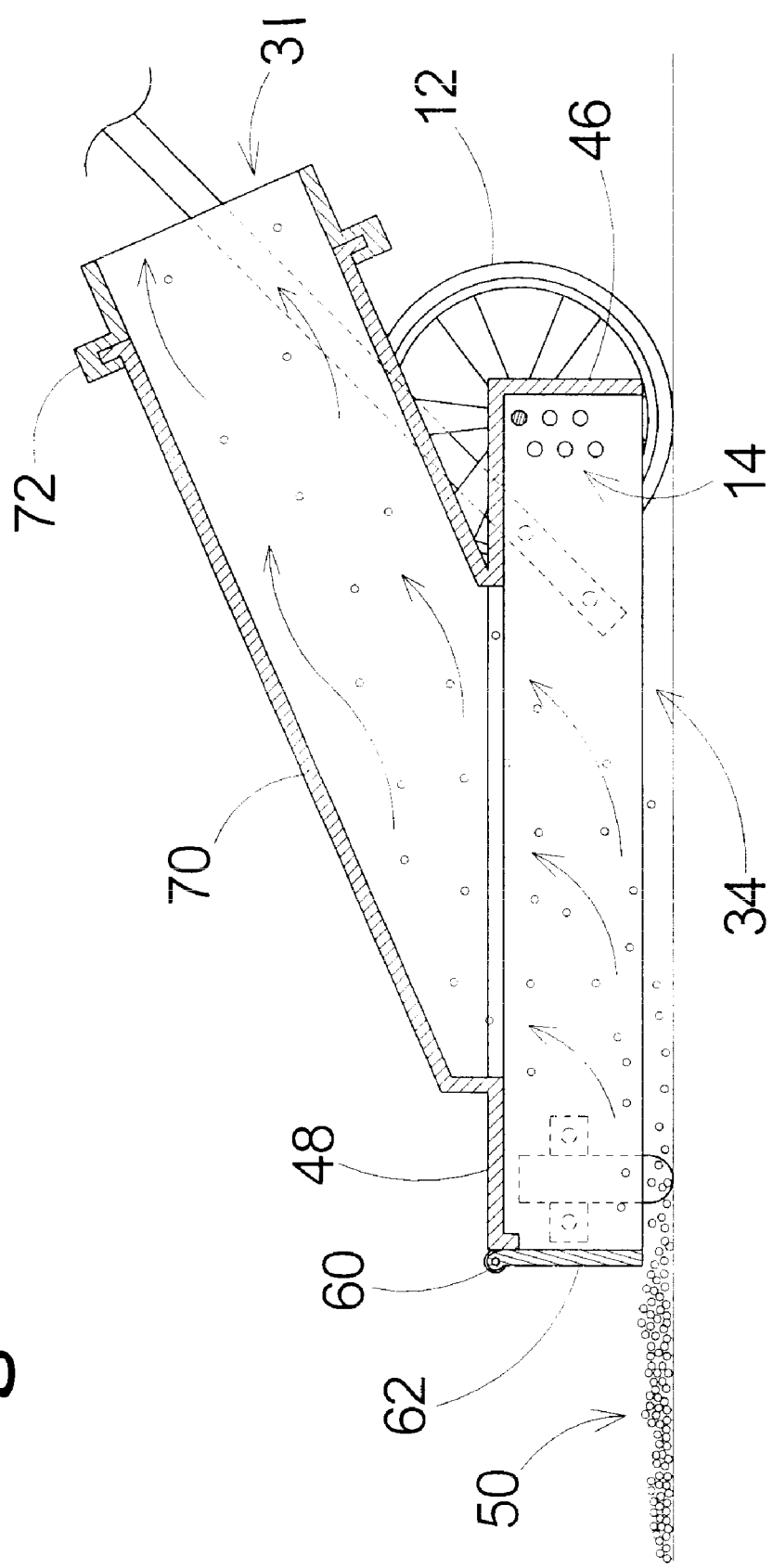
FIG. 2 is a schematic cross-sectional view of the present invention in use conveying particles of grain from the floor, with the front portion of the inlet covered.
Figure 3:
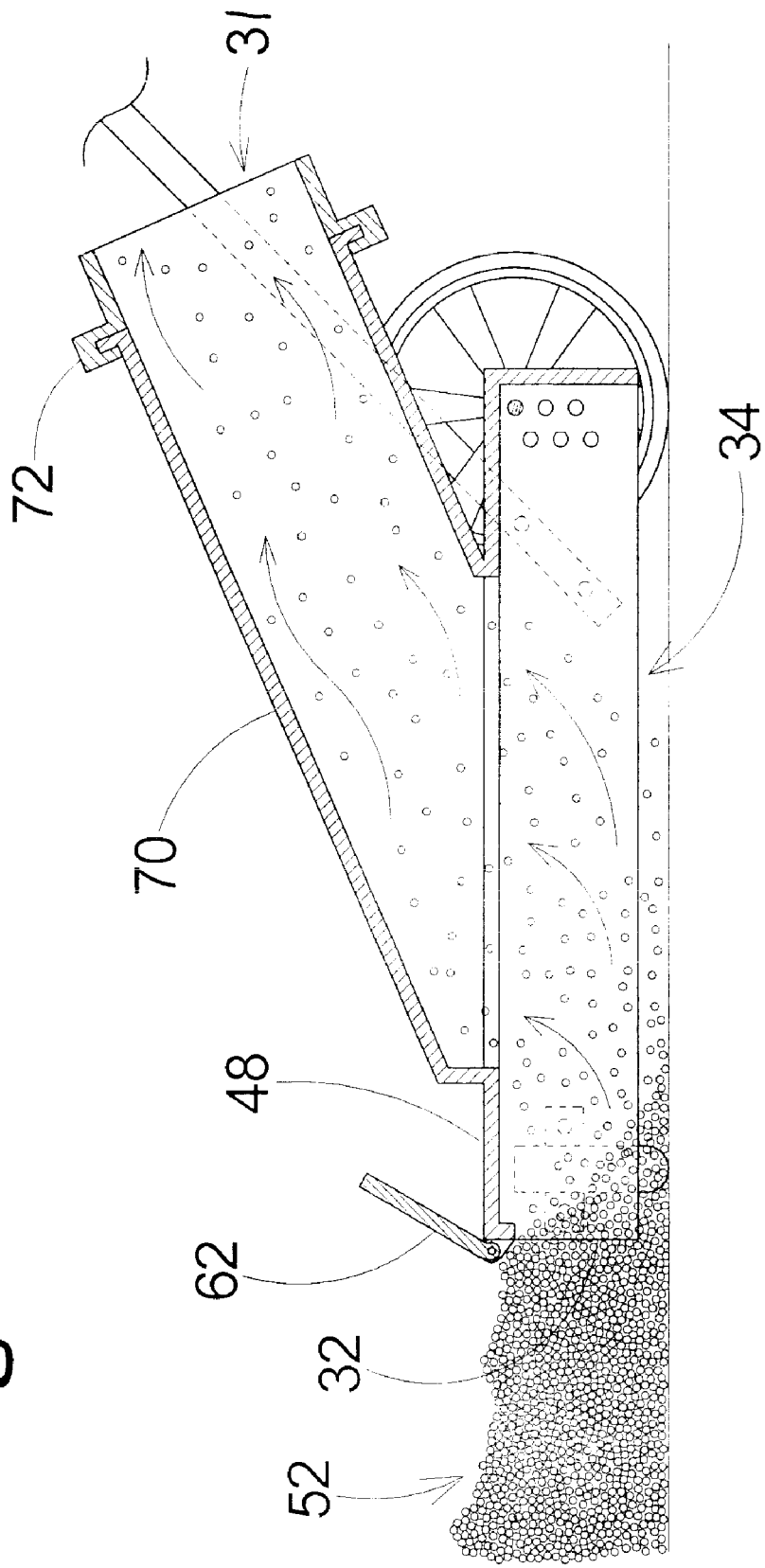
FIG. 3 is a schematic cross-sectional view of the present invention in use conveying particles of grain from a pile of grain, with the front portion of the inlet uncovered.

As shown in FIGS. 1, 2 and 3, the invention contemplates a convertible particulate vacuum attachment 10 for conveying a pile of material or dispersed particles on a surface into a vacuum. The attachment 10 generally comprises a housing structure 20 defining a chamber, with an inlet 21 in fluid communication with the chamber and an outlet 30 in fluid communication with the chamber. Illustratively, the housing structure 20 may be substantially rectangular in shape, having left 40 and right 42 sidewalls, front 44 and back 46 sidewalls and a top wall 48. The housing structure may be free of a bottom wall, although in some embodiments, the housing structure may have a partial bottom wall. Those skilled in the art will recognize that the housing structure 20 may take forms different from that described above, but for the ease of description, the invention will be described in the context of the illustrative housing structure.

The inlet 21 of the housing structure 20 defines an inlet opening. In one illustrative embodiment, the inlet opening may include a first inlet portion 32 and a second inlet portion 34, which may be located adjacent to each other and may be in communication with each other. The inlet allows communication of particles from outside of the housing structure, through the chamber, and into the attached vacuum source. The first inlet portion 32 may be smaller in size than the second inlet portion 34. The first inlet portion 32 has a first area in size, and the second inlet portion 34 has a second area in size. In some embodiments, the first area may be smaller in size than the second area, and in some embodiments the first area is not zero and the second area is not zero. The first inlet portion 32 and the second inlet portion 34 may be positioned in different planes (for example, first and second planes that are not coplanar), and illustratively the second inlet portion 34 may be positioned in a plane that is perpendicular to the plane of the first inlet portion 44. The first inlet portion 32 may have a substantially vertical orientation and the second inlet portion 34 may have a substantially horizontal orientation.

In the illustrative embodiment, the first inlet portion 32 may be located at the front of the housing structure 20 and the second inlet portion 34 may be located at the bottom of the housing structure 20. The first inlet portion 32 may be located in the plane of the front sidewall 44 of the housing structure 20. The first inlet portion 32 effectively allows the vacuum attachment to address particles in a piled arrangement. The first inlet portion 32 may be formed by a substantially rectangular frame adjacent to the front sidewall 44, having a top frame portion, a left frame portion and a right frame portion. While the first inlet portion 32 and the second inlet portion 34 are not typically separated from each other, it is contemplated that a member may extend between the first and second inlet portions. For example, the frame may have a bottom frame member that extends across a lower portion of the first inlet portion, and may nominally divide the first inlet portion from the second inlet portion. Other configurations of the first inlet portion 32 and second inlet portion 34 are possible, such that the portions together form an inlet opening in the same plane.

The second inlet portion 34 may be located in the plane of the bottom wall of the housing structure 20. The second inlet portion 34 permits fluid communication between the chamber and materials outside of the second inlet portion 34. The second inlet portion 34 of the inlet effectively allows the vacuum attachment to address loose particles of grain 50 on the surface underneath the second inlet portion 34, through the chamber and into the vacuum source.

An area changing structure may function as a means of closing or blocking a portion of the inlet opening to selectively modify or vary the area of the inlet opening, such that an area of the inlet opening is reduced or enlarged. In the illustrative embodiment, a door 62 is employed to selectively modify the size of the area of the inlet opening. The door 62 may be moved between a first position and a second position, such that the door 62 may cover at least a portion of the inlet in the second position. The first position may generally correspond to a closed position of the door 62, and the second position may generally correspond to an open position of the door. The door 62 may be configured to selectively close or block the second inlet portion 34 of the inlet opening in a manner such that the first inlet portion 32 of the inlet opening remains open and substantially unobstructed. In contrast, the outlet opening 31 of the outlet 30 of the housing structure 20 may have a substantially fixed area.

A pivoting mechanism may link the door 62 to the housing structure about a portion of the inlet so that the position of the door 62 in respect to the housing structure could be manipulated. One or more hinge elements 60 may mount the door 62 to the housing structure 20 to permit pivoting of the door 62 with respect to the housing structure 20 and the inlet opening. The hinge elements 60 may be located on an exterior surface of the top frame portion. In the illustrative embodiment, the door 62 is primarily rectangular in shape and has a top and bottom edge and left and right edge. The door 62 may be constructed of a substantially rigid material such as metal or another suitable material. However, flexible materials with sufficient degree of rigidity to resist being moved out of position when covering the first inlet portion 32 may be used. The door 62 may be connected to the hinge elements along its top edge so the door can be rotated along the hinge axis. Those skilled in the art will recognize that the structure for closing may take a number of different forms and may move in a number of different ways, including, for example, a panel that slides with respect to the inlet opening to cover the first inlet portion 32 of the inlet opening.

The door 62 is shown in FIG. 2 in the first or closed position so that the door 62 covers the first inlet portion 32, effectively blocking fluid communication between the chamber and the space located outside of the first inlet portion 32. With the first inlet portion 32 closed or blocked, all vacuum pressure from the vacuum source is directed through the second inlet portion 34.

In the second or open position, as shown in FIG. 3, the door 62 is rotated along the hinge axis so the door 62 is swung substantially clear of the first inlet portion 32. In the second or open position, vacuum pressure from the vacuum source is directed through both the first inlet portion 32 and second inlet portion 34. Illustratively, grain from a pile of grain 52 located adjacent to the first inlet portion is able to move through either the first inlet portion 32 or the second inlet portion 34 (or both) into the chamber and into the vacuum source.

The housing structure 20 may have an outlet tube 70 located on the top wall 48 with a first end and a second end. The diameter of the tube 70 may be sized appropriately for the type and strength of the vacuum source to which it will be connected. In the illustrative embodiment, the outlet tube 70 may have a diameter of approximately seven to approximately eight inches. The tube 70 may be constructed of a durable, substantially rigid material, preferably a metal material or an appropriate equivalent. Proximate to the first end of the tube 70 may be a swivel mechanism 72 that allows a length of the tube to swivel in relation to the rest of the tube. The length of the tube 70 that is permitted to swivel may be approximately six inches. The swivel mechanism allows the convertible particulate vacuum attachment to be more freely maneuvered when attached to a suction unit. The second end of the tube may be attached to the upper surface of the top wall 48 so that the tube 70 is in fluid communication with the chamber. The second end of the tube 70 may be mounted to the top wall 48 of the housing structure such that the tube forms an angle in relation to the plane of the top wall. In some embodiments, the angle of the tube 70 may range from approximately 15 degrees to approximately 30 degrees in relation to the top wall 48 of the housing structure 20.

The housing structure 20 may be constructed primarily of a substantially rigid material, such as a metal, but could also be constructed of a durable polymer or other suitable material.

Wheels 12 may be mounted on the housing structure 20 to facilitate the movement of the housing structure across the surface. The wheels 12 may be mounted on the housing structure 20 using wheel brackets. In some embodiments, wheels with a diameter of 16 inches or greater may be used to increase the attachment's mobility by limiting the binding caused when wheels of a smaller diameter contact the grain particles 50 on the surface being vacuumed by the attachment 10. The wheels 12 may comprise a hub and spokes for allowing grain particles that might otherwise be trapped between the wheel and the housing structure to escape. In some embodiments, the spokes may be of the wire variety. In other embodiments, the spokes may be of a molded variety, in which case fewer spokes may be necessary to support the wheel. Individual spokes of a molded variety may be thicker and more able to prevent wear and deformation of the wheel, thereby improving the device's durability.

Wheel brackets may be located on the left and right sidewalls, near the back sidewall 46 of the housing structure 20, for attaching wheels 12 to the device. The wheel brackets may comprise adjustable structures that the distance between the surface on which the attachment 10 rests, and the housing structure. Optionally, a plurality of apertures 14 may be located in the left and right sidewalls of the housing structure 20 to selectively mount wheels 12 on the housing structure 20, where the final height of the housing structure depends upon which aperture is selected.

The convertible particulate vacuum attachment 10 may be provided with a handle 22. The handle 22 may be of a collapsible or folding type to reduce the size of the attachment 10 for storage. The handle may comprise an upper handle portion 24 and a lower handle portion 26. The lower handle portion 26 may include two laterally spaced legs mounted to the housing structure at the right sidewall and left sidewall, towards the rear of the housing structure. The upper handle portion 24 may comprise a substantially U-shaped member with legs that correspond in position to the lower handle portion 26. The upper handle portion may be connected to the lower handle portion through a pivoting connector 28, so that the upper handle portion can pivot in relation to the lower handle portion. In some embodiments, the handle 22 may be formed of hollow tubular metal.

The attachment 10 may include elongated skids 16 for positioning the housing structure in a substantially parallel orientation with respect to the ground. The elongated skids 16 may be mounted to the left and right sidewalls near the first inlet portion. The skids 16 may be held in place with a fastening device 18, preferably a strap. The fastening device 18 may permit the skids to be adjusted upwardly and downwardly so that the front of the housing structure can be lifted or lowered. The fastening device 18 may also comprise a screw, bolt, pin or other appropriate fastener. Optionally, if the flow of grain into the inlet portions 32, 34 of the attachment 10 is believed to be excessive, adjustments to the elongated skids 16 and wheels 12 could be performed to appropriately lower the height of the housing structure 20 with respect to the surface. Lowering the height effectively restricts flow into the inlet portions, reducing the flow rate of grain through the inlet. Conversely, if the flow of grain into the inlet portion or portions is believed to be too restricted, the skid 16 and wheels 12 could be adjusted to raise the housing structure 20 with respect to the surface, thereby increasing the rate at which material is conveyed through the attachment 10. The elongated skids are resistant to the possibility of particulate matter interfering with operation of the skid mechanism as the skids do not rotate or otherwise move in relation to the housing structure, as would a small wheel.

In use, the collapsible handle 22 may be folded to facilitate insertion of the convertible particulate vacuum attachment 10 into a grain bin. Once inside the bin, the collapsible handle 22 may be expanded so that the attachment 10 is in an operating configuration, as shown in FIG. 1. The vacuum source may then be connected to the outlet tube 70 of the convertible particulate vacuum attachment 10 with a flexible tube or similar fluid conducting channel. Suction from the vacuum source would be directed first through this fluid conducting channel, through the outlet of the attachment 10, through the chamber, and then through the inlet of the attachment 10. In order to vacuum piles of grain 52, the user may rotate the door 62 of the attachment 10 to the open position, exposing the first inlet portion 32. The first inlet portion 32 would then be positioned adjacent to a pile of grain 52, so that suction generated by vacuum source would pull the grain particles through the first inlet portion 32 as well as the second inlet portion 34 of the inlet of the attachment 10. As the pile of grain 52 is conveyed, the first inlet portion 32 of the attachment 10 would be kept adjacent to the pile 52 until the pile of grain is substantially entirely conveyed.

Once the pile or piles of grain 52 are conveyed, the attachment 10 could be converted for conveying any grain particles 50 remaining on the floor surface of the grain bin. To convert the attachment 10, the user rotates the door 62 to its closed position, so that the door 62 substantially covers the first inlet portion 32. In this configuration, suction generated by the vacuum source would be directed through the second inlet portion 34, conveying grain particles 50 located beneath the attachment 10 through the chamber and into the vacuum source.

When vacuum conveying is completed, the attachment 10 could be separated from the hose linking it to the vacuum source at the outlet of the outlet tube 70. The attachment 10 could then be collapsed for convenient removal from the grain bin. The attachment 10 may remain collapsed to facilitate storage.

Figure 4:
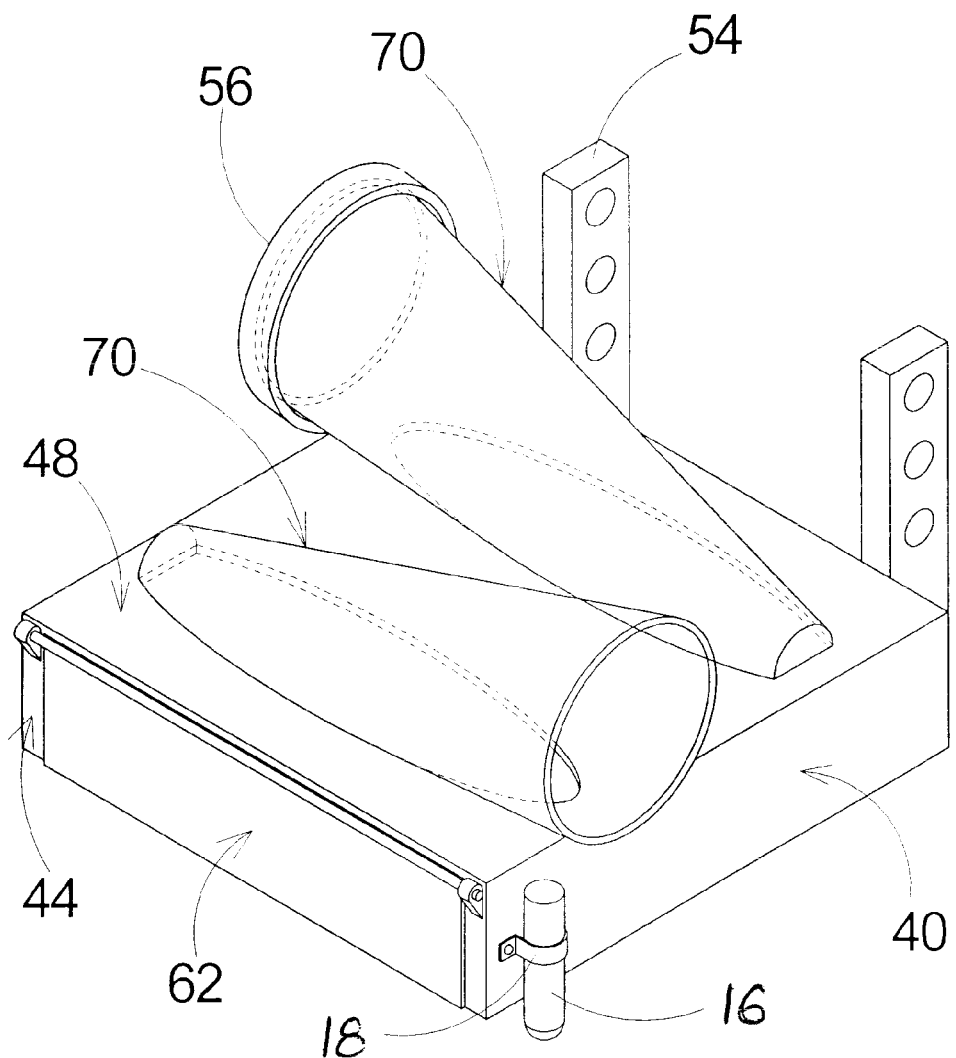
FIG. 4 is a schematic perspective view of an optional embodiment to the present invention.
Figure 5:
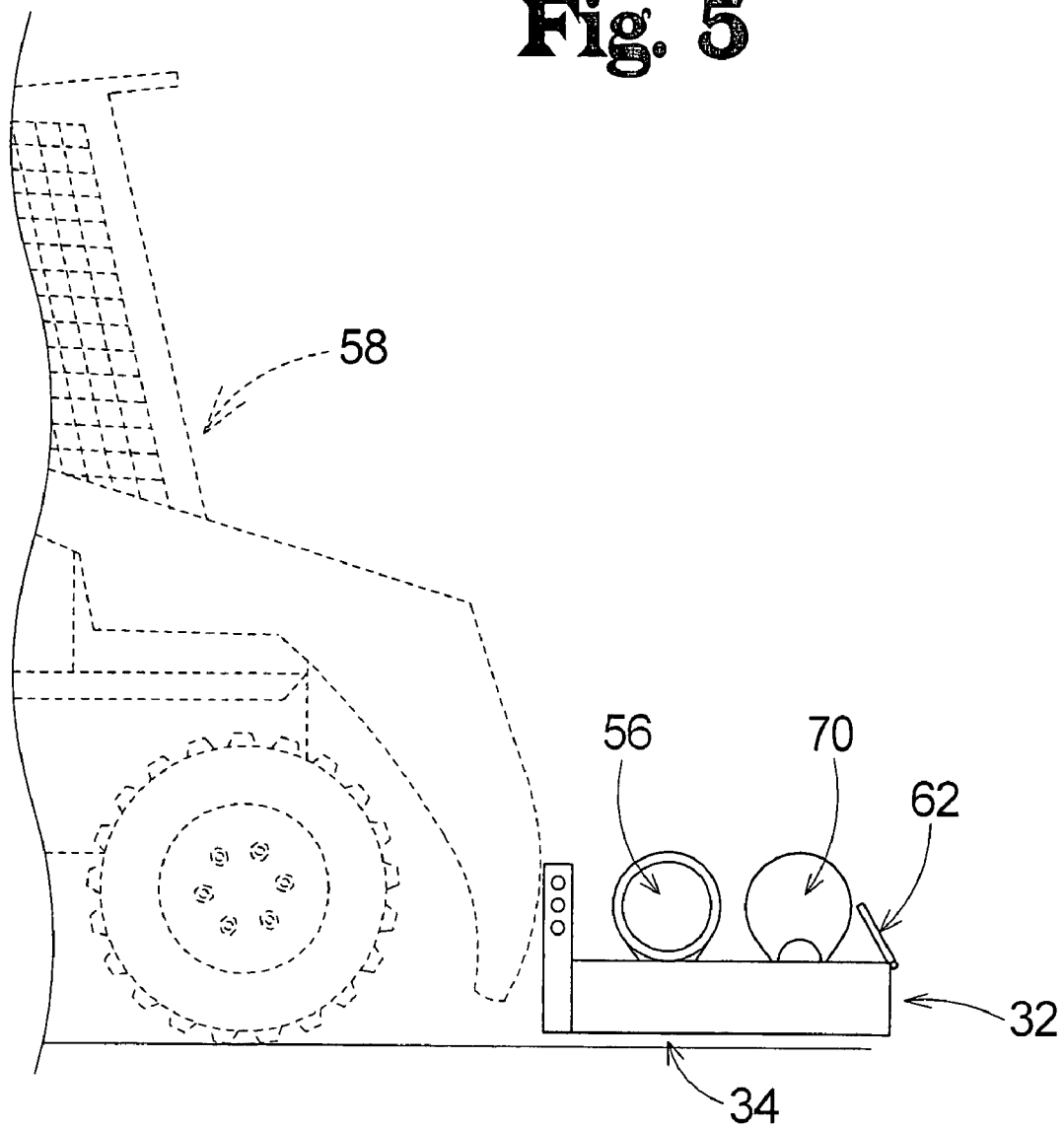
FIG. 5 is a schematic right side elevation view of an optional embodiment to the present invention as attached to a skid steer tractor.

In FIGS. 4 and 5, an optional embodiment of the convertible particulate vacuum attachment 10 is shown. In this embodiment, vertical support brackets 54 are attached to the back sidewall 46 of the housing structure 20 so that the attachment 10 can be mounted on a vehicle, such as the loader arm 58 of a skid steer tractor 58. Two outlet tubes 70 may be located on the top wall of the housing structure 20 such that the outlet tubes 70 are each in fluid communication with the chamber enclosed by the housing structure 20. The tubes 70 may be oriented opposite each other, so that an outlet opening 31 is available on both the left and right side of the attachment 10. In use, a vacuum source may be connected to one of these tubes, on the side of the attachment most convenient to make such a connection. A sealing cap 56 may be provided to seal the unused tube by forming a vacuum seal on the disconnected tube.

Although the present invention is described in terms of vacuuming up grains, it will be realized by those skilled in the art that that the present invention can be used to vacuum virtually any particulate matter.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A convertible vacuum attachment apparatus for conveying a particulate material located on a substantially horizontal surface on which the apparatus is rested, the attachment apparatus comprising
    a housing defining a chamber, the housing having an inlet in fluid communication with the chamber, the inlet defining an inlet opening, the housing having an outlet in fluid communication with the chamber for connection to a vacuum source;
    an area changing structure configured to change an area of the inlet opening;
    wherein the housing has a bottom plane defined by lower edges of sidewalls forming the housing, at least a portion of the inlet opening being in the bottom plane;
    an adjustable spacing structure configured to adjustably space the bottom plane of the housing, and the portion of the inlet opening in the bottom plane, from the surface to create a gap between the bottom plane and the surface; and
    a bracket assembly mounted on the housing, the bracket assembly being configured to connect to the lift arms of a loader vehicle so that the gap between the bottom plane of the housing and the surface is adjustable by movement of the lift arms of the loader vehicle; and
    wherein the housing includes an outlet with a pair of outlet openings, a first one of the outlet openings being positioned toward an opposite lateral side of the housing from a second one of the outlet openings.

2. The apparatus of claim 1 wherein the inlet opening has a first portion and a second portion, and the first area corresponds to the first portion of the inlet opening and the second area corresponds to the first portion and the second portion of the inlet opening; and
    wherein the area changing structure if configured to selectively close the first portion of the inlet opening in a manner such that the second portion of the inlet opening remains open.

3. The apparatus of claim 1 wherein the inlet opening has a first portion and a second portion, and the first area corresponds to the first portion of the inlet opening and the second area corresponds to the first portion and the second portion of the inlet opening; and
    wherein the area changing structure comprises a door configured to cover the first portion of the inlet opening in a manner such that the second portion of the inlet opening is open.

4. The apparatus of claim 3 wherein the door is movable between a first position and a second position, the first position of the door being characterized by the door covering the first portion of the inlet opening and the second portion of the inlet opening being open, and the second position of the door being characterized by the door not covering the first portion of the inlet opening such that the first and second portions of the inlet opening are open.

5. The apparatus of claim 3 wherein in the first position, the door does not cover the second portion of the inlet opening.

6. The apparatus of claim 4 wherein the door is pivotally mounted on the housing to swing between the first and second positions.

7. The apparatus of claim 4 wherein the first position of the door corresponds to the inlet opening having a size corresponding to the first area and the second position of the door corresponds to the inlet opening having a size corresponding to a total of the first area and the second area.

8. The apparatus of claim 1 wherein the inlet opening has a first portion and a second portion, and wherein the first portion of the inlet opening is positioned in a first plane and the second portion of the inlet opening is positioned in a second plane, and the first and second planes are not coplanar.

9. The apparatus of claim 8 wherein the first plane is oriented substantially perpendicular to the second plane.

10. The apparatus of claim 8 wherein the first plane is oriented substantially vertically.

11. The apparatus of claim 10 wherein the second plane is oriented substantially horizontally.

12. A convertible vacuum apparatus for conveying a particulate material located on a substantially horizontal surface on which the apparatus is rested, the attachment apparatus comprising
    a housing defining a chamber, the housing having an inlet in fluid communication with the chamber, the inlet defining an inlet opening, the housing having an outlet in fluid communication with the chamber for connection to a vacuum source;
    an area changing structure configured to change an area of the inlet opening;
    wherein the housing has a bottom plane defined by lower edges of sidewalls forming the housing, at least a portion of the inlet opening being in the bottom plane;
    an adjustable spacing structure configured to adjustably space the bottom plane of the housing, and the portion of the inlet opening in the bottom plane, from the surface to create a gap between the bottom plane and the surface;
    wherein the inlet opening has a first portion and a second portion, and a first area corresponds to the first portion of the inlet opening and a second area corresponds to the first portion and the second portion of the inlet opening;
    wherein the housing has a front extending from a first lateral side of the housing to a second lateral side of the housing, the first portion of the inlet opening extending from the first lateral side to the second lateral side of the housing to occupy substantially an entirety of the front of the housing;
    wherein the first area is smaller than the second area, and the first area is not zero and the second area is not zero;
    wherein a handle is mounted on the housing, the handle extending upwardly and rearwardly from the housing;
    wherein the area changing structure is configured to selectively close the first portion of the inlet opening in a manner such that the second portion of the inlet opening remains open;
    wherein the outlet of the housing defines an outlet opening with a substantially fixed area;

wherein the area changing structure comprises a door configured to cover the first portion of the inlet opening in a manner such that the second portion of the inlet opening is open;

wherein the door is movable between a first position and a second position, the first position of the door being characterized by the door covering the first portion of the inlet opening and the second portion of the inlet opening being open, and the second position of the door being characterized by the door not covering the first portion of the inlet opening such that the first and second portions of the inlet opening are open;

wherein in the first position, the door does not cover the second portion of the inlet opening;

wherein the door is pivotally mounted on the housing to swing between the first and second positions;

wherein the first position of the door corresponds to the inlet opening having a size corresponding to the first area and the second position of the door corresponds to the inlet opening having a size corresponding to a total of the first area and the second area, the first area and the second area being different in size;

wherein the first portion of the inlet opening is positioned in a first plane and the second portion of the inlet opening is positioned in a second plane, and the first and second planes are not coplanar;

wherein the first plane is oriented substantially perpendicular to the second plane;

wherein the first plane is oriented substantially vertically;

wherein the second plane is oriented substantially horizontally;

wherein the adjustable spacing structure comprises a pair of wheels rotatably mounted on the housing, the pair of wheels extending downwardly below the bottom plane of the housing to rest upon the surface, each of the wheels being adjustably mounted on the housing to permit adjustment of a distance to which the wheels extends below the bottom plane of the housing, the pair of wheels being positioned toward a rear of the housing; and wherein the adjustable spacing structure comprises at least one skid extending downwardly below the bottom plane of the housing to contact the surface, the at least one skid having a substantially rounded lower end for contacting the surface, the at least one skid being positioned toward a front of the housing and generally opposite of the position of the wheels.

* * * * *